(12) United States Patent
Duroux et al.

(10) Patent No.: US 6,555,222 B1
(45) Date of Patent: Apr. 29, 2003

(54) REINFORCED POLYPROPYLENE MIRROR ASSEMBLY AND PROCESS FOR MAKING THE SAME

(75) Inventors: Bernard Duroux, Garancieres (FR); Gilles Benoit, Ozoir la Ferriere (FR)

(73) Assignee: Schefenacker Vision Systems France SA, Dammarie-les-Lys Cedex (FR)

( * ) Notice: Subject to any disclaimer, the term of this patent is extended or adjusted under 35 U.S.C. 154(b) by 0 days.

(21) Appl. No.: 09/482,464

(22) Filed: Jan. 13, 2000

(51) Int. Cl.$^7$ .................................................. B32B 5/16
(52) U.S. Cl. ........................ 428/406; 428/364; 428/378; 428/384
(58) Field of Search ................................ 428/285, 294, 428/299, 300, 301, 364, 375, 392, 406, 378, 384

(56) References Cited

U.S. PATENT DOCUMENTS

| | | |
|---|---|---|
| 3,370,480 A | 2/1968 | Gionet et al. |
| 4,103,560 A | 8/1978 | Stoffel et al. |
| 4,105,301 A | 8/1978 | Doeg |
| 4,167,306 A | 9/1979 | Longland |
| 4,245,893 A | 1/1981 | Lafont et al. |
| 4,250,767 A | 2/1981 | Bottrill |
| 4,251,316 A | 2/1981 | Smallbone |
| 4,475,414 A | 10/1984 | Manzoni |
| 4,679,758 A | 7/1987 | Boddy et al. |
| 4,740,066 A | 4/1988 | Whitehead |
| 4,755,033 A | 7/1988 | Whitehead et al. |
| 4,830,327 A | 5/1989 | Fimeri |
| 4,836,491 A | 6/1989 | Fimeri |
| 4,854,539 A | 8/1989 | Glue |
| 4,856,885 A | 8/1989 | Fimeri |
| 4,867,409 A | 9/1989 | Fimeri |
| 4,871,953 A | 10/1989 | Anstee |
| 4,881,418 A | 11/1989 | Fimeri |
| 4,900,142 A | 2/1990 | Duroux |
| 4,904,074 A | 2/1990 | Gilbert |
| 4,914,972 A | 4/1990 | Manzoni |
| 4,918,920 A | 4/1990 | Duroux |
| 4,919,525 A | 4/1990 | Gilbert |
| 4,932,766 A | 6/1990 | Harry |
| 5,081,546 A | 1/1992 | Bottrill |
| 5,166,832 A | 11/1992 | Zychowicz |
| RE34,142 E | 12/1992 | Fimeri |
| 5,205,182 A | 4/1993 | Gilbert |
| 5,331,471 A | 7/1994 | Gilbert |
| 5,355,255 A | 10/1994 | Assinder |
| 5,432,460 A | 7/1995 | Gilbert et al. |
| 5,436,769 A | 7/1995 | Gilbert et al. |
| 5,514,745 A | * 5/1996 | Yoshino ..................... 524/496 |
| 5,540,986 A | * 7/1996 | Kimura et al. ............. 428/285 |
| 5,563,744 A | 10/1996 | Matsumiya |
| 5,660,770 A | * 8/1997 | Wernicke et al. ............. 264/38 |
| 5,828,504 A | * 10/1998 | Beuzeville .................. 359/841 |
| 5,838,507 A | 11/1998 | Boddy et al. |
| 5,841,594 A | 11/1998 | Rothe |
| 5,949,596 A | 9/1999 | Schubert |
| 5,971,544 A | 10/1999 | Henion |

* cited by examiner

Primary Examiner—Merrick Dixon
(74) Attorney, Agent, or Firm—Warn, Burgess & Hoffmann, P.C.

(57) ABSTRACT

A reinforced polypropylene mirror assembly, and process for making the same, are described. The mirror assembly, especially the components thereof, includes a long glass fiber reinforced polypropylene material. Additionally, various additives may also be included in the reinforced polypropylene material, such as a UV stabilizer. Because of the physical properties of the reinforced polypropylene material, it is possible to combined several individual components of a conventional automobile side view mirror assembly into single, integral components, thus reducing part content, vehicle weight, and construction costs.

26 Claims, 5 Drawing Sheets

REINFORCED POLYPROPYLENE MIRROR ASSEMBLY AND PROCESS FOR MAKING THE SAME

BACKGROUND OF THE INVENTION

1. Technical Field

The present invention relates generally to automobile exterior mirror assemblies and more particularly to automobile exterior mirror assemblies comprised of long glass fiber reinforced, UV-stabilized polypropylene materials.

2. Discussion

Automobile exterior mirror assemblies are well-known in the art. One common type of automobile exterior mirror assembly is the side view mirror assembly, which generally allows a driver to observe oncoming automobiles approaching from the rear of the vehicle, either to the left rear side of the vehicle (if one side view mirror is employed) or from both the left and right rear sides of the vehicle (if dual side view mirrors are employed). The deployment and use of such side view mirror assemblies has greatly aided in the safe operation of automobiles.

With reference to FIG. 1, a conventional side view mirror assembly 10 is typically installed on an exterior surface of one or more of the vehicle's doors 12. With reference to FIGS. 1 and 2, a conventional side view mirror assembly 10 generally include a base plate or cover 14 containing a metallic base chassis 16 which is mounted to the exterior surface of the vehicle's door 12. A mirror case or housing 18 is pivotably fastened to the base cover 14, allowing the mirror case 18 to move inwardly and outwardly along a horizontal axis relative to the vehicle. A reflective mirror 20 is movably supported within the mirror case 18. The mirror 20 is typically mounted to a mounting plate assembly 22 which allows the mirror 20 to pivot several degrees in several different directions. The mounting plate assembly 22 is typically mounted to a metallic frame 24 secured to the interior surface of the mirror case 18. The metallic frame 24 may also include a portion that functions as a pivot assembly 26.

In modern automobiles, a mirror position adjustment assembly 28 may be provided which allows the mirror 20 to be remotely positioned from inside the vehicle passenger compartment. Typically, a series of cables 30 extend from the back of the mounting plate assembly 22, through various apertures located in the metallic frame 24 and base cover 14, and terminate on a control panel 32 which may include control means 34, such as levers, knobs, toggle switches, and the like, which permit the cables 30 to be manipulated in such a way so as to change the position of the mirror 20.

A more complete discussion of automobile exterior mirror assemblies, including their construction and operation, can be found in U.S. Pat. Nos. 3,370,480; 4,103,560; 4,105,301; 4,167,306; 4,245,893; 4,250,767; 4,251,316; 4,475,414; 4,679,758; 4,740,066; 4,755,033; 4,830,327; 4,836,491; 4,854,539; 4,856,885; 4,867,409; 4,871,953; 4,881,418; Re. 34,142; 4,900,142; 4,904,074; 4,914,972; 4,918,920; 4,919,525; 4,932,766; 5,081,546; 5,166,832; 5,205,182; 5,331,471; 5,355,255; 5,432,640; 5,436,769; 5,563,744; 5,828,504; 5,838,507; 5,841,594; 5,949,596; and 5,971,554, the specifications of all of which are expressly incorporated herein by reference.

Because of increased pressure to reduce automobile construction costs, as well as to increase fuel efficiency, automobile manufacturers have begun to focus on reducing part content and replacing heavy and expensive component materials, such as metallic materials with lighter and less expensive materials, such as thermoplastic materials.

For example, the manufacturers of automobile exterior mirror assemblies have recently started to replace certain metallic components of the mirror assembly, such as the metallic support bracket, as well as the bracket frame and the mirror housing, with polyamide-based materials, such as nylon, or ASA-based materials (acrylic-styrene-acrylonitrile).

Typically, the polyamide is reinforced with various filler materials to provide, among other things, the requisite amount of structural performance, e.g., strength, durability, and the like. One type of common reinforcing material that has been employed are glass fibers, which would typically be present in the amount of about 15 weight percent in filled polyamide-based materials. Although exterior mirror assembly components comprised of filled polyamide-based materials have exhibited adequate strength, durability, and aesthetic appeal, the use of these materials has not achieved the desired cost and weight savings.

ASA-based materials have also proved to be unsatisfactory, in that the high gloss levels present on the exterior surfaces of the finished parts have raised aesthetic concerns.

Accordingly, manufacturers have turned their attention to other lighter and less expensive thermoplastic materials, such as polypropylene, especially filled polypropylene.

A general discussion of filled polypropylene materials, including their preparation, can be found by referring to the following U.S. patents:

U.S. Pat. No. 5,514,745, the entire specification of which is expressly incorporated herein by reference, discloses a mixture for melt process moldings, and a molding formed of the mixture. The mixture consists essentially of about 5 to about 70 weight percent of a master batch prepared in the form of pellets formed by cutting a long glass fiber reinforced polypropylene resin, and about 30 to about 90 weight percent of polypropylene resin. The long glass fiber reinforced polypropylene resin is prepared in such a manner that a bundle of continuous reinforcement glass fibers surface-finished with a finishing agent containing a coupling agent is impregnated with a modified polypropylene resin having a functional group capable of chemically bonding with the coupling agent and having a flow rate of about 70 to about 300 grams/10 minutes while the bundle of glass fibers is being drawn. The pellets have a length of about 2 to about 50 millimeters in the direction along the fibers. The glass fibers in the pellets extend uniformly in parallel with each other through a distance substantially equal to the length of the pellets. The pellets have a glass fiber content of about 60 to about 90 weight percent.

U.S. Pat. No. 5,540,986, the entire specification of which is expressly incorporated herein by reference, discloses a stampable sheet made of fiber-reinforced thermoplastic resin whose reinforcement is a glass fiber mat in which a non-oriented fiber layer and a unidirectional fiber layer are mechanically intertwined with each other. In the stampable sheet made of the fiber-reinforced thermoplastic resin, a content of the glass long-fiber bundles forming the unidirectional fiber layer, in the glass fiber mat is 20 weight percent to 80 weight percent, and the glass fiber mat, in which a significant amount of glass long-fiber bundles among the glass long-fiber bundles forming the unidirectional fiber layer or a significant amount of glass long-fibers in the glass long-fiber bundles forming the unidirectional fiber layer is substantially under a relaxation condition, is used in an amount of 20 weight percent to 55 weight percent.

U.S. Pat. No. 5,660,770, the entire specification of which is expressly incorporated herein by reference, discloses a process which includes comminuting a first thermoplastic material, e.g., polypropylene, reinforced with short glass fiber (10–40 micrometers). One hundred parts by weight of the comminuted material are mixed with 11–43 parts by weight of chips of a second thermoplastic material, which is reinforced with long glass fiber (about 10–20 millimeters). The melts of the two thermoplastic materials should be mutually mixable. The mixture is subjected to thermoplastic forming.

Recent attempts to manufacture exterior mirror assembly components with filled polypropylene have generally produced unsatisfactory results. Although the use of short glass fiber filled polypropylene allowed manufacturers to reduce costs and weight to a certain extent, several significant problems were identified. First, the use of glass fibers at too low of a weight percent has resulted in structural performance concerns, such as impaired strength and impact resistance. Conversely, the use of glass fibers at too high of a weight percent has resulted in aesthetic appearance concerns, such as surface irregularities caused by protruding glass fibers.

Therefore, there exists a need for automobile exterior side view mirror assembly components comprised of filled polypropylene materials, wherein the components exhibit outstanding physical performance characteristics, are aesthetically pleasing, and are easily and inexpensively manufactured.

SUMMARY OF THE INVENTION

In accordance with one embodiment of the present invention, an automotive exterior mirror assembly component is provided, wherein the component is comprised of a mixture of polypropylene and long glass fibers.

In accordance with another embodiment of the present invention, an automotive exterior mirror case component is provided, wherein the component is comprised of a mixture of polypropylene and long glass fibers.

In accordance with still another embodiment of the present invention, an automotive exterior base plate component is provided, wherein the component is comprised of a mixture of polypropylene and long glass fibers.

In accordance with yet another embodiment of the present invention, an automotive exterior integral mirror case/frame component is provided, wherein the component is comprised of a mixture of polypropylene and long glass fibers.

In accordance with still yet another embodiment of the present invention, an automotive exterior integral base plate/base chassis component is provided, wherein the component is comprised of a mixture of polypropylene and long glass fibers.

In accordance with a further embodiment of the present invention, a method for making an automotive exterior mirror assembly component is provided, comprising:

providing a mixture of polypropylene and long glass fibers;

heating the mixture above its glass transition temperature;

injecting the heated mixture into a cavity of a mold, wherein the cavity has a configuration substantially identical to the component; and removing the component from the cavity of the mold.

A more complete appreciation of the present invention and its scope can be obtained from understanding the accompanying drawings, which are briefly summarized below, the following detailed description of the invention, and the appended claims.

BRIEF DESCRIPTION OF THE DRAWINGS

The same reference numerals refer to the same parts throughout the various Figures.

DETAILED DESCRIPTION OF THE PREFERRED EMBODIMENTS

Figure 1:
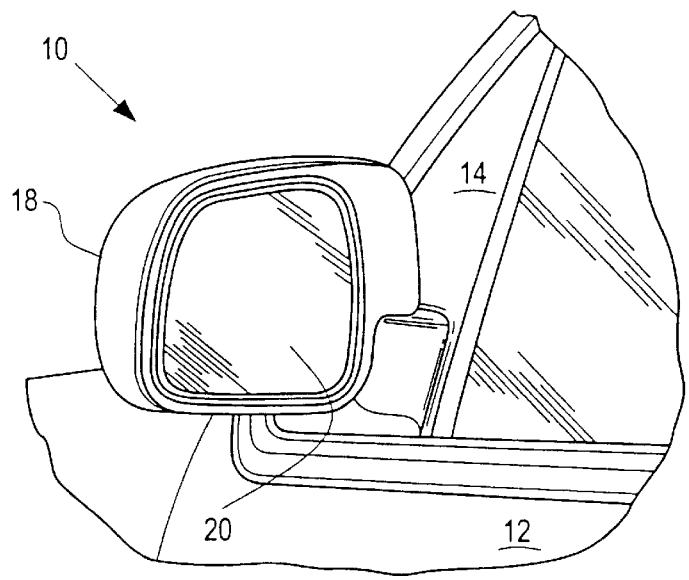
FIG. 1 is a partial perspective view of an exterior mirror assembly shown in operative installed relationship to an exterior surface of an automobile, in accordance with the prior art.
Figure 2:
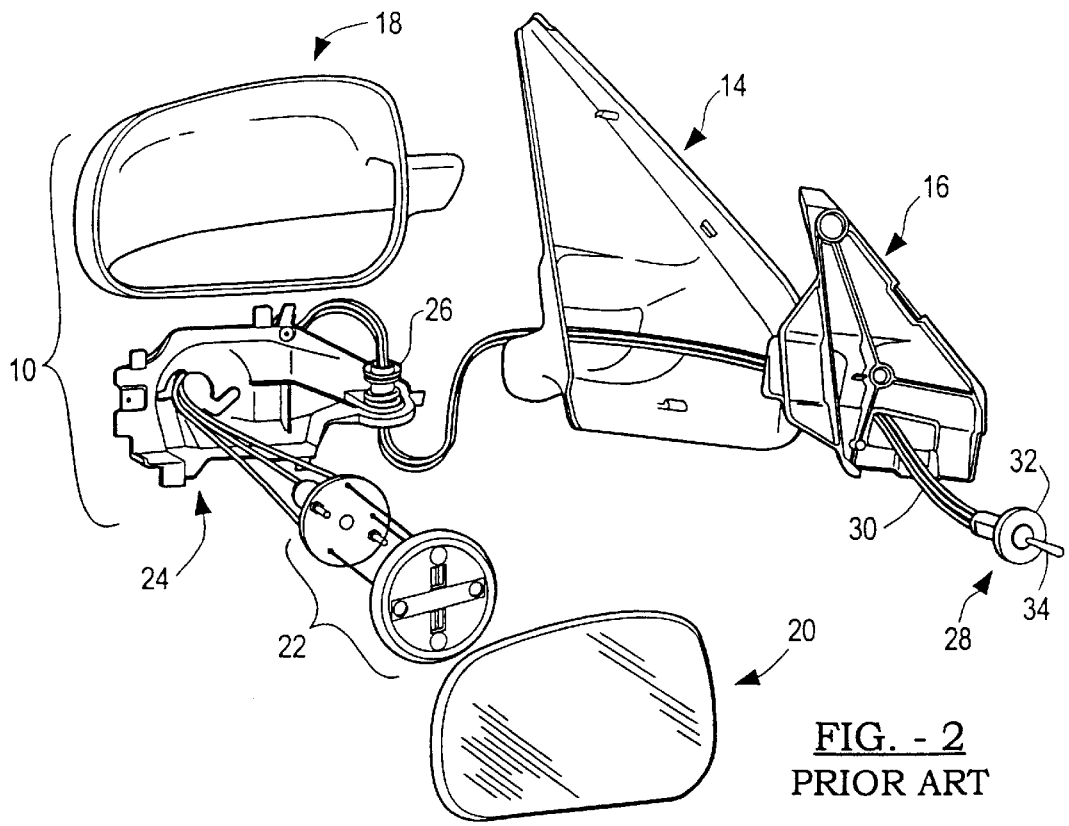
FIG. 2 is an exploded view of an exterior mirror assembly, in accordance with the prior art.

The present invention is directed primarily to automobile exterior side view mirror assembly components comprised of long glass fiber reinforced or filled polypropylene materials, including those containing a UV-stabilizer. It should be noted that the terms "filled" and "reinforced" are being used interchangeably in the description of the present invention. Although the following description will focus on the applicability of the present invention with respect to automobile exterior side view mirror assembly components comprised of these reinforced polypropylene materials, it should be noted that the present invention can be practiced with any number of different types of parts, components, or assemblies, and applications therefor.

In accordance with one aspect of the present invention, various components of an automobile exterior mirror assembly are comprised of a long glass fiber reinforced polypropylene material. The respective weight percentages of the polyproplyene and the long glass fibers may vary quite considerably. However, it has been noted that while a relatively high weight percentage (e.g., 30 or greater weight percent) of long glass fibers results in increased structural strength in the part or component, it also results in a higher incidence of surface irregularities in the part or component. However, for truck mirror components, where aesthetic concerns are generally outweighed by durability concerns, these types of relatively high weight percent long glass fiber reinforced polypropylene materials may be suitable. Conversely, it has also been noted that while a relatively low weight percentage (i.e., less than 20 weight percent) of long glass fibers results in a decrease in surface irregularities in the part or component, it also results in a higher incidence of structural strength deficiencies. However, for sedans and coupes, where aesthetic concerns generally outweigh durability concerns, these types of relatively low weight percent long glass fiber reinforced polypropylene materials may be suitable.

Preferably, the long glass fiber is present in a weight percentage of less than about 30, more preferably in the range of about 20 to less than about 30, still more preferably in the range of about 25 to less than about 30, and most preferably in the range of about 25 to about 28, all of these ranges being based on the total weight of the part or component.

The long glass fiber reinforced polypropylene material of the present invention is readily commercially available from Ticona, Inc. (Summit, N.J.) under the tradename CELSTRAN®. One preferred type of CELSTRAN® brand product is PP-GF50-04®, which is a colorless reinforced polypropylene material containing 50 weight percent unidirectional long glass fibers. It should be noted that other reinforced polypropylene materials may be employed with various weight percentages (e.g., 30 or 40 weight percent) of long glass fibers.

The long glass fibers present in CELSTRAN® brand products are typically 9–12 mm in length, compared to short glass fibers, which are typically 0.5–1.0 mm in length. The long glass fibers provide several physical property enhancements, such as higher impact strength, improved modulus at elevated temperatures, and better dimensional stability.

CELSTRAN® brand products are manufactured by pulling continuous fiber tows through a thermoplastic polymer (e.g., polypropylene) melt in a specialized processing die. The ratio of fiber to resin is controlled by a metering orifice. The resulting rods are cut into pellets, typically 8–12 mm in length, that can be injection molded to form a part of component.

Using conventional, screw-compounding technology, the modulus of a thermoplastic polymer (e.g., polypropylene) can be improved by the addition of glass fiber, with a subsequent reduction in impact resistance. Impact resistance can be improved by the addition of an impact modifier, but this usually results in a reduction in modulus. However, long glass fibers provide simultaneous improvement in the modulus and impact resistance properties of the thermoplastic polymer (e.g., polypropylene).

Impact strength is retained at temperature extremes. This is related to the fiber network that is formed from the entanglement of the long glass fibers. The extent of the network that is formed can be seen by exposing a molded part to pyrolysis conditions (e.g., 600 C for 2 hours). This removes the polymer and leaves behind the long glass reinforcing fibers. The fiber network that is formed with the long glass fiber reinforced polypropylene material retains the shape of the molded part. This network is believed to be largely responsible for the improvements that are seen in impact strength. It is also the basis for the improvements that are seen in high temperature modulus retention.

Long glass fiber reinforced polypropylene materials also provide improved retention of modulus at elevated temperatures when compared to short glass fiber reinforced polypropylene materials. This is especially true at temperatures between the $T_g$ and $T_m$ of the base polymer.

The entangled, long glass fiber network that is formed when molding long glass fiber reinforced polypropylene materials also reduces the level of shrinkage that takes place as a part cools. This provides for improved dimensional stability, especially for relatively large parts.

In order to impart a color to the reinforced polypropylene material, it is necessary to add a coloring agent. One preferred type of coloring agent is readily commercially available from Targor, Inc. (Paris, France) under the tradename HOSTACOM®. One preferred type of HOSTACOM® brand product is PPU 1752®, which is a polyproplyene material containing a black coloring agent. By way of a non-limiting example, a mixture of 50 weight percent PPU 1752® can be blended with 50 weight percent PP-GF50-04® in order to create a black-colored, long glass fiber reinforced polypropylene material containing 25 weight percent long glass fibers. This material can then be formed into a number of exterior mirror assembly components. It should be noted that other coloring agents can be employed in various weight percentages.

Various other additives may be added to the long glass fiber reinforced polypropylene materials of the present invention. One preferred additive is a UV stabilizer, in order to protect the finished part or component from degradation caused by ultraviolet radiation. It is believed that PPU 1752® contains a UV-stabilizer.

Figure 3:
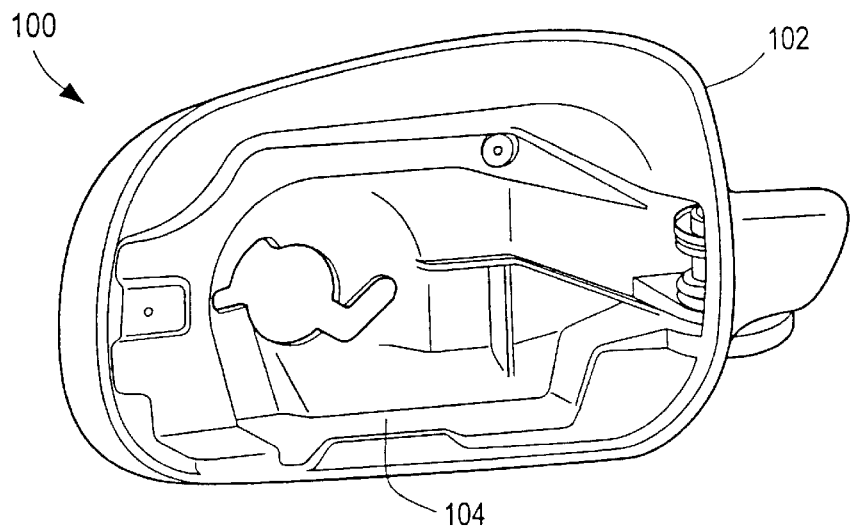
FIG. 3 is a perspective view of an integrated mirror case/frame component, produced in accordance with one aspect of the present invention.

Because of the physical properties of the long glass fiber reinforced polypropylene material of the present invention, it is possible to combine several individual components of a conventional automobile side view mirror assembly into single, integral components, thus reducing part content, vehicle weight, and construction costs. For example, it is possible with the long glass fiber reinforced polypropylene material of the present invention to combine the case and frame components into a single, integrated or integral component (see FIG. 3) comprised of a relatively lightweight yet sturdy material, where previously two separate components were required. The integral case/frame component 100 is actually comprised of a case subcomponent 102 that has a frame subcomponent 104 formed upon a surface thereof.

Figure 4:
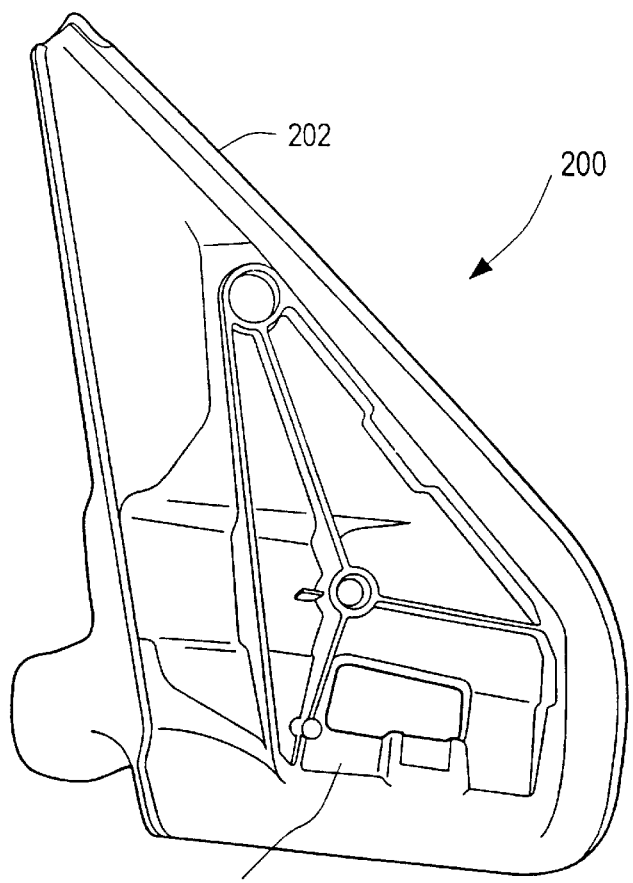
FIG. 4 is a perspective view of an integrated base cover/base chassis component, produced in accordance with one aspect of the present invention.

Similarly, it is possible with the long glass fiber reinforced polypropylene material of the present invention to combine the cover and base components into a single, integrated or integral component (see FIG. 4) comprised of a relatively lightweight yet sturdy material, where previously two separate components were required. The integral cover/base component 200 is actually comprised of a cover subcomponent 202 that has a base subcomponent 204 formed upon a surface thereof. Not only is part content reduced, but also weight is reduced by eliminating the need for conventional frames and bases, respectively, which are typically constructed of relatively heavy metallic materials, e.g., zinc.

In addition to the cost, weight, and part content advantages, the mirror assembly components comprised of long glass fiber reinforced polypropylene materials have an aesthetically pleasing surface appearance. This is due, in part, to the lack of surface glass fibers being present, as is the case typically with short glass fiber reinforced thermoplastic materials. Thus, the surface of the mirror assembly components comprised of long glass fiber reinforced polypropylene materials have a smooth appearing surface. Additionally, the surface gloss levels of the mirror assembly components are reduced, as compared to conventional ASA-based mirror assembly components, thus resulting in an aesthetically pleasing matte-like surface appearance.

Those skilled in the art will appreciate that the long glass fiber reinforced polypropylene materials of the present invention, including any additives, can be formed into a number of parts and components by conventional methods, for example, injection molding. Basically, the long glass fiber reinforced polypropylene materials of the present invention, which are normally in pellet form, are heated above the glass transition temperature ($T_g$), forced through a heated cylinder, and then injected into a closed mold cavity. The mold cavity preferably has a configuration substantially identical to the desired shape of the part to be formed. After cooling, the part, in this case an exterior mirror assembly component, is removed from the mold cavity.

In order to evaluate the physical performance characteristics of the components produced in accordance with the general teachings of the present invention, a series of vibration studies were conducted, whereby the peak and effective acceleration levels were determined at increasing frequency levels. The components studied were a left and right side base plate produced in accordance with the general teachings of the present invention, and a left and right side conventional base plate comprised of polyamide-based materials having 15 weight percent short glass fibers contained therein. The acceleration measurements were obtained for the X, Y, and Z vectors for both types of base plates. Additionally, the overall automobile acceleration/frequency spectrum was measured for comparison purposes.

Table I, below, shows the results of the vibration study for both types of left side (of the vehicle) base plates, with particular focus on the X vector:

TABLE I

| Frequency (Hz) | Peak Acceleration ($m/s^2$) for the base plate of the present invention | Peak Acceleration ($m/s^2$) for the polyamide-based base plate | Effective Acceleration ($m/s^2$) for the base plate of the present invention | Effective Acceleration ($m/s^2$) for the polyamide-based base plate |
|---|---|---|---|---|
| 10 | 20.0 | 20.0 | 14.14 | 14.14 |
| 15 | 15.0 | 7.9 | 10.61 | 5.59 |
| 20 | 10.7 | 5.0 | 7.57 | 3.54 |
| 25 | 10.7 | 8.3 | 7.57 | 5.87 |
| 30 | 10.0 | 7.6 | 7.07 | 5.37 |
| 35 | 8.3 | 6.4 | 5.89 | 4.53 |
| 40 | 8.0 | 5.4 | 5.66 | 3.82 |
| 45 | 6.5 | 4.1 | 4.60 | 2.90 |
| 50 | 4.9 | 2.9 | 3.46 | 2.05 |
| 55 | 3.1 | 1.1 | 2.20 | 0.78 |
| 60 | 1.4 | 0.5 | 0.99 | 0.35 |
| 65 | 1.1 | 1.9 | 0.78 | 1.34 |
| 70 | 2.7 | 3.1 | 1.87 | 2.19 |
| 75 | 4.6 | 4.4 | 3.25 | 3.11 |
| 80 | 6.3 | 5.4 | 4.45 | 3.82 |
| 85 | 8.3 | 6.4 | 5.87 | 4.53 |
| 90 | 9.5 | 7.4 | 6.72 | 5.23 |
| 95 | 10.0 | 7.6 | 7.07 | 5.37 |
| 100 | 10.9 | 5.8 | 7.71 | 4.10 |

Figure 5:
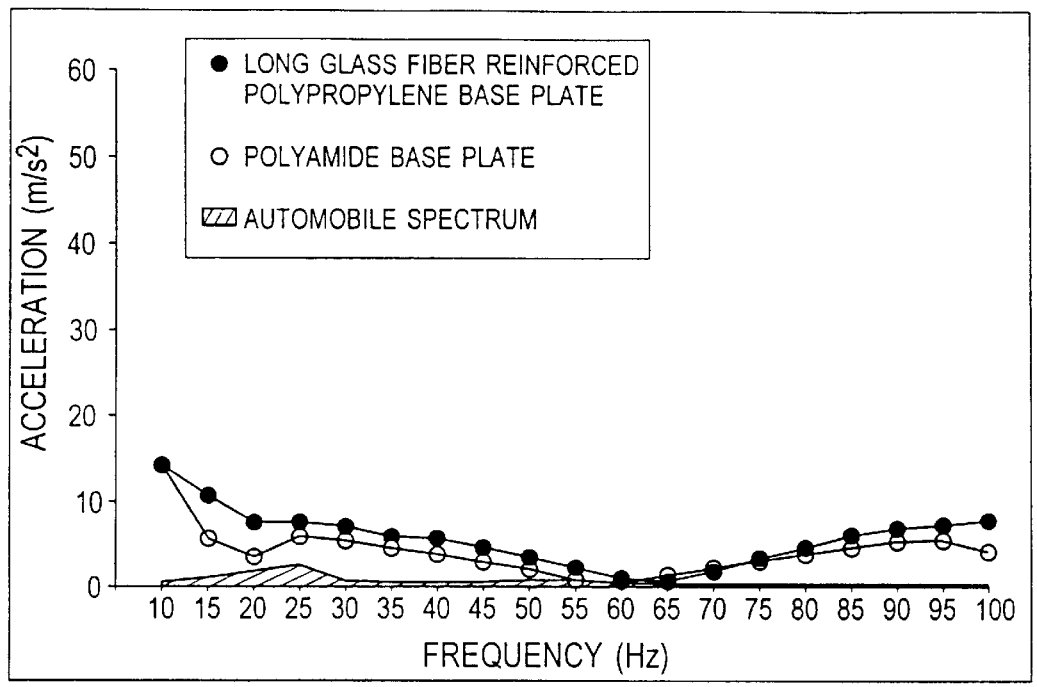
FIG. 5 is a graphical illustration of a comparison of the results of a vibration study focusing on the X vector, among a left side base plate produced in accordance with one aspect of the present invention, a conventional left side base plate comprised of a polyamide-based material, and the whole automobile itself.

FIG. 5 is a graphical illustration of a comparison of the results of the same vibration study focusing on the X vector, among a left side base plate produced in accordance with one aspect of the present invention (e.g., long glass fiber reinforced polypropylene materials wherein the long glass fibers are present in the amount of about 25 weight percent based on the total weight of the component), a conventional left side base plate comprised of a polyamide-based material, and the whole automobile itself.

Table II, below, shows the results of the vibration study for both types of left side (of the vehicle) base plates, with particular focus on the Y vector:

TABLE II

| Frequency (Hz) | Peak Acceleration ($m/s^2$) for the base plate of the present invention | Peak Acceleration ($m/s^2$) for the polyamide-based base plate | Effective Acceleration ($m/s^2$) for the base plate of the present invention | Effective Acceleration ($m/s^2$) for the polyamide-based base plate |
|---|---|---|---|---|
| 10 | 20.0 | 20.0 | 14.14 | 14.14 |
| 15 | 19.0 | 12.7 | 13.44 | 8.98 |
| 20 | 15.0 | 13.6 | 10.61 | 9.62 |
| 25 | 16.3 | 13.8 | 11.53 | 9.76 |
| 30 | 12.7 | 11.6 | 8.98 | 8.20 |
| 35 | 16.7 | 13.9 | 11.81 | 9.83 |
| 40 | 14.9 | 12.6 | 10.54 | 8.91 |
| 45 | 13.2 | 9.5 | 9.33 | 6.72 |
| 50 | 9.2 | 6.7 | 6.51 | 4.74 |
| 55 | 6.9 | 4.2 | 4.84 | 2.97 |
| 60 | 3.3 | 1.0 | 2.33 | 0.71 |
| 65 | 2.7 | 2.7 | 1.91 | 1.91 |
| 70 | 8.9 | 7.2 | 6.26 | 5.09 |
| 75 | 19.4 | 12.3 | 13.72 | 8.70 |
| 80 | 32.1 | 21.1 | 22.70 | 14.92 |
| 85 | 56.0 | 29.9 | 39.60 | 21.14 |
| 90 | 60.0 | 49.4 | 42.43 | 34.93 |
| 95 | 61.0 | 57.1 | 43.13 | 40.38 |
| 100 | 62.0 | 57.1 | 43.84 | 40.38 |

Figure 6:
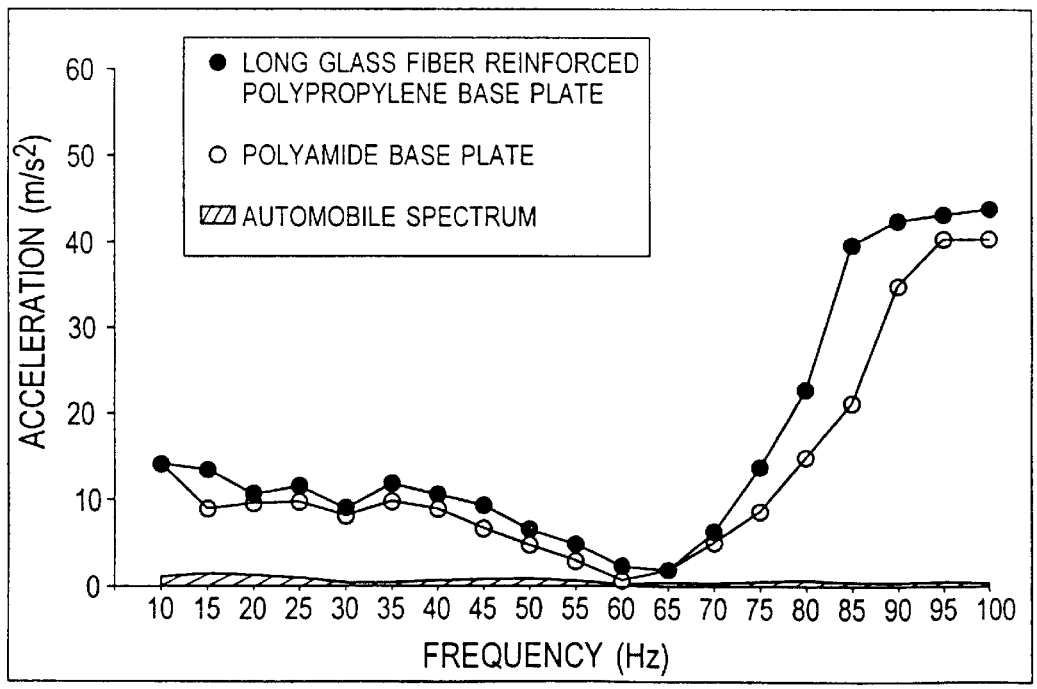
FIG. 6 is a graphical illustration of a comparison of the results of a vibration study focusing on the Y vector, among a left side base plate produced in accordance with one aspect of the present invention, a conventional left side base plate comprised of a polyamide-based material, and the whole automobile itself.

FIG. 6 is a graphical illustration of a comparison of the results of the same vibration study focusing on the Y vector, among a left side base plate produced in accordance with one aspect of the present invention (e.g., long glass fiber reinforced polypropylene materials wherein the long glass fibers are present in the amount of about 25 weight percent based on the total weight of the component), a conventional left side base plate comprised of a polyamide-based material, and the whole automobile itself.

Table III, below, shows the results of the vibration study for both types of left side (of the vehicle) base plates, with particular focus on the Z vector:

TABLE III

| Frequency (Hz) | Peak Acceleration (m/s$^2$) for the base plate of the present invention | Peak Acceleration (m/s$^2$) for the polyamide-based base plate | Effective Acceleration (m/s$^2$) for the base plate of the present invention | Effective Acceleration (m/s$^2$) for the polyamide-based base plate |
|---|---|---|---|---|
| 10 | 15.0 | 15.0 | 10.61 | 10.61 |
| 15 | 10.0 | 15.5 | 7.07 | 10.96 |
| 20 | 6.8 | 5.0 | 4.77 | 3.54 |
| 25 | 9.7 | 5.3 | 6.87 | 3.75 |
| 30 | 4.4 | 1.8 | 3.11 | 1.27 |
| 35 | 4.8 | 7.6 | 3.37 | 5.37 |
| 40 | 8.6 | 13.1 | 6.08 | 9.26 |
| 45 | 11.4 | 14.1 | 8.06 | 9.97 |
| 50 | 11.7 | 10.8 | 8.27 | 7.64 |
| 55 | 9.2 | 6.8 | 6.51 | 4.81 |
| 60 | 4.2 | 4.8 | 2.93 | 3.39 |
| 65 | 13.6 | 30.9 | 9.62 | 21.85 |
| 70 | 36.0 | 56.2 | 25.46 | 39.74 |
| 75 | 80.0 | 52.9 | 56.57 | 37.41 |
| 80 | 80.0 | 57.9 | 56.57 | 40.94 |
| 85 | 80.0 | 53.7 | 56.57 | 37.97 |
| 90 | 80.0 | 48.3 | 56.57 | 34.15 |
| 95 | 80.0 | 35.9 | 56.57 | 25.39 |
| 100 | 80.0 | 21.9 | 56.57 | 15.49 |

Figure 7:
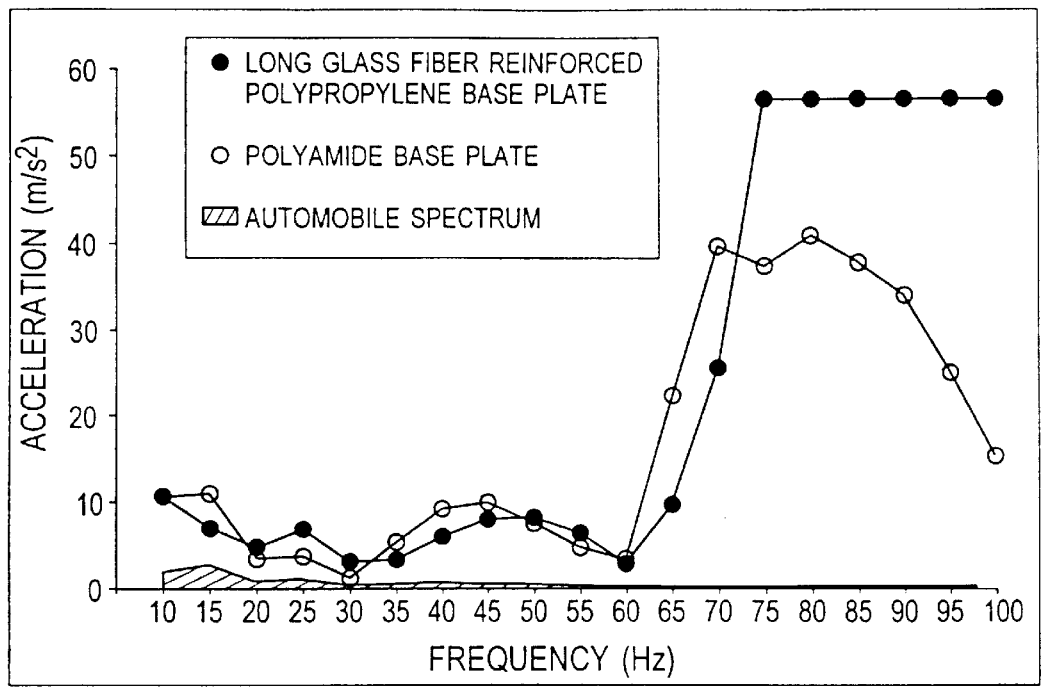
FIG. 7 is a graphical illustration of a comparison of the results of a vibration study focusing on the Z vector, among a left side base plate produced in accordance with one aspect of the present invention, a conventional left side base plate comprised of a polyamide-based material, and the whole automobile itself.

FIG. 7 is a graphical illustration of a comparison of the results of the same vibration study focusing on the Z vector, among a left side base plate produced in accordance with one aspect of the present invention (e.g., long glass fiber reinforced polypropylene materials wherein the long glass fibers are present in the amount of about 25 weight percent based on the total weight of the component), a conventional left side base plate comprised of a polyamide-based material, and the whole automobile itself.

Table IV, below, shows the results of the vibration study for both types of right side (of the vehicle) base plates, with particular focus on the X vector:

TABLE IV

| Frequency (Hz) | Peak Acceleration (m/s$^2$) for the base plate of the present invention | Peak Acceleration (m/s$^2$) for the polyamide-based base plate | Effective Acceleration (m/s$^2$) for the base plate of the present invention | Effective Acceleration (m/s$^2$) for the polyamide-based base plate |
|---|---|---|---|---|
| 10 | 20.0 | 15.0 | 14.14 | 10.61 |
| 15 | 15.0 | 10.0 | 10.61 | 7.07 |
| 20 | 11.7 | 9.4 | 8.27 | 6.61 |
| 25 | 11.2 | 8.3 | 7.92 | 5.89 |
| 30 | 11.4 | 8.2 | 8.06 | 5.76 |
| 35 | 9.0 | 7.3 | 6.36 | 5.16 |
| 40 | 6.6 | 8.3 | 4.67 | 5.87 |
| 45 | 10.9 | 9.4 | 7.71 | 6.61 |
| 50 | 7.9 | 6.9 | 5.59 | 4.84 |
| 55 | 6.0 | 4.9 | 4.24 | 3.44 |
| 60 | 3.5 | 3.0 | 2.47 | 2.12 |
| 65 | 1.7 | 1.4 | 1.20 | 0.96 |
| 70 | 1.1 | 0.6 | 0.80 | 0.45 |
| 75 | 2.4 | 1.8 | 1.66 | 1.27 |
| 80 | 4.5 | 2.8 | 3.21 | 1.99 |
| 85 | 6.2 | 4.6 | 4.35 | 3.26 |
| 90 | 7.7 | 5.7 | 5.47 | 4.01 |
| 95 | 9.6 | 6.2 | 6.79 | 4.35 |
| 100 | 9.9 | 7.6 | 6.97 | 5.37 |

Figure 8:
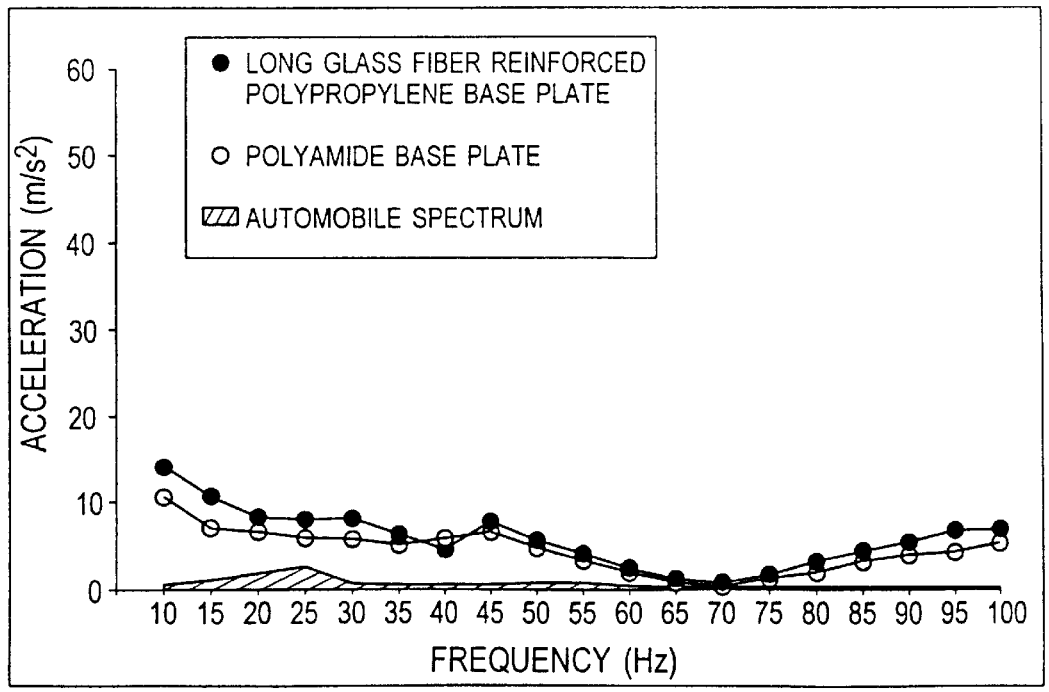
FIG. 8 is a graphical illustration of a comparison of the results of a vibration study focusing on the X vector, among a right side base plate produced in accordance with one aspect of the present invention, a conventional right side base plate comprised of a polyamide-based material, and the whole automobile itself.

FIG. 8 is a graphical illustration of a comparison of the results of the same vibration study focusing on the X vector, among a right side base plate produced in accordance with one aspect of the present invention (e.g., long glass fiber reinforced polypropylene materials wherein the long glass fibers are present in the amount of about 25 weight percent based on the total weight of the component), a conventional right side base plate comprised of a polyamide-based material, and the whole automobile itself.

Table V, below, shows the results of the vibration study for both types of right side (of the vehicle) base plates, with particular focus on the Y vector:

TABLE V

| Frequency (Hz) | Peak Acceleration (m/s$^2$) for the base plate of the present invention | Peak Acceleration (m/s$^2$) for the polyamide-based base plate | Effective Acceleration (m/s$^2$) for the base plate of the present invention | Effective Acceleration (m/s$^2$) for the polyamide-based base plate |
|---|---|---|---|---|
| 10 | 20.0 | 25.0 | 14.14 | 17.68 |
| 15 | 19.0 | 23.0 | 13.44 | 16.26 |
| 20 | 16.3 | 18.2 | 11.53 | 12.87 |
| 25 | 12.3 | 16.7 | 8.70 | 11.81 |
| 30 | 11.8 | 14.8 | 8.34 | 10.47 |
| 35 | 10.0 | 12.5 | 7.07 | 8.84 |
| 40 | 6.0 | 10.3 | 4.24 | 7.28 |
| 45 | 12.8 | 20.4 | 9.05 | 14.42 |
| 50 | 10.0 | 17.0 | 7.07 | 12.02 |
| 55 | 7.4 | 11.2 | 5.23 | 7.92 |
| 60 | 4.7 | 8.0 | 3.32 | 5.66 |
| 65 | 2.5 | 4.3 | 1.77 | 3.05 |
| 70 | 1.3 | 1.1 | 0.93 | 0.80 |
| 75 | 3.6 | 4.0 | 2.55 | 2.83 |
| 80 | 7.7 | 8.0 | 5.44 | 5.66 |
| 85 | 13.0 | 13.4 | 9.19 | 9.48 |
| 90 | 18.0 | 17.5 | 12.73 | 12.37 |
| 95 | 29.0 | 19.6 | 20.51 | 13.86 |
| 100 | 34.3 | 26.0 | 24.25 | 18.38 |

Figure 9:
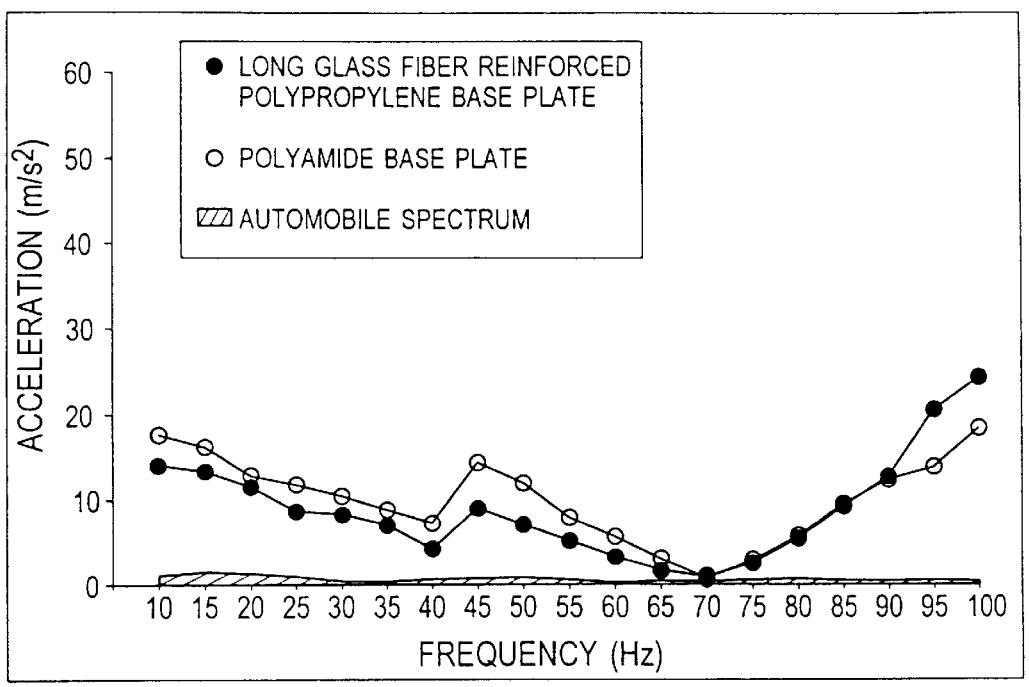
FIG. 9 is a graphical illustration of a comparison of the results of a vibration study focusing on the Y vector, among a right side base plate produced in accordance with one aspect of the present invention, a conventional right side base plate comprised of a polyamide-based material, and the whole automobile itself.

FIG. 9 is a graphical illustration of a comparison of the results of the same vibration study focusing on the Y vector, among a right side base plate produced in accordance with one aspect of the present invention (e.g., long glass fiber reinforced polypropylene materials wherein the long glass fibers are present in the amount of about 25 weight percent based on the total weight of the component), a conventional right side base plate comprised of a polyamide-based material, and the whole automobile itself.

Table VI, below, shows the results of the vibration study for both types of right side (of the vehicle) base plates, with particular focus on the Z vector:

TABLE VI

| Frequency (Hz) | Peak Acceleration (m/s²) for the base plate of the present invention | Peak Acceleration (m/s²) for the polyamide-based base plate | Effective Acceleration (m/s²) for the base plate of the present invention | Effective Acceleration (m/s²) for the polyamide-based base plate |
|---|---|---|---|---|
| 10 | 15.0 | 15.0 | 10.61 | 10.61 |
| 15 | 10.0 | 12.0 | 7.07 | 8.49 |
| 20 | 6.8 | 11.3 | 4.77 | 7.99 |
| 25 | 9.7 | 9.8 | 6.87 | 6.93 |
| 30 | 4.4 | 11.2 | 3.11 | 7.92 |
| 35 | 4.8 | 3.6 | 3.37 | 2.55 |
| 40 | 8.6 | 4.1 | 6.08 | 2.91 |
| 45 | 11.4 | 6.5 | 8.06 | 4.62 |
| 50 | 11.7 | 9.5 | 8.27 | 6.72 |
| 55 | 9.2 | 8.9 | 6.51 | 6.31 |
| 60 | 4.2 | 7.6 | 2.93 | 5.39 |
| 65 | 13.6 | 4.3 | 9.62 | 3.04 |
| 70 | 36.0 | 5.5 | 25.46 | 3.89 |
| 75 | 80.0 | 18.0 | 56.57 | 12.73 |
| 80 | 80.0 | 39.0 | 56.57 | 27.58 |
| 85 | 80.0 | 60.0 | 56.57 | 42.43 |
| 90 | 80.0 | 61.0 | 56.57 | 43.13 |
| 95 | 80.0 | 62.0 | 56.57 | 43.84 |
| 100 | 80.0 | 63.0 | 56.57 | 44.55 |

Figure 10:
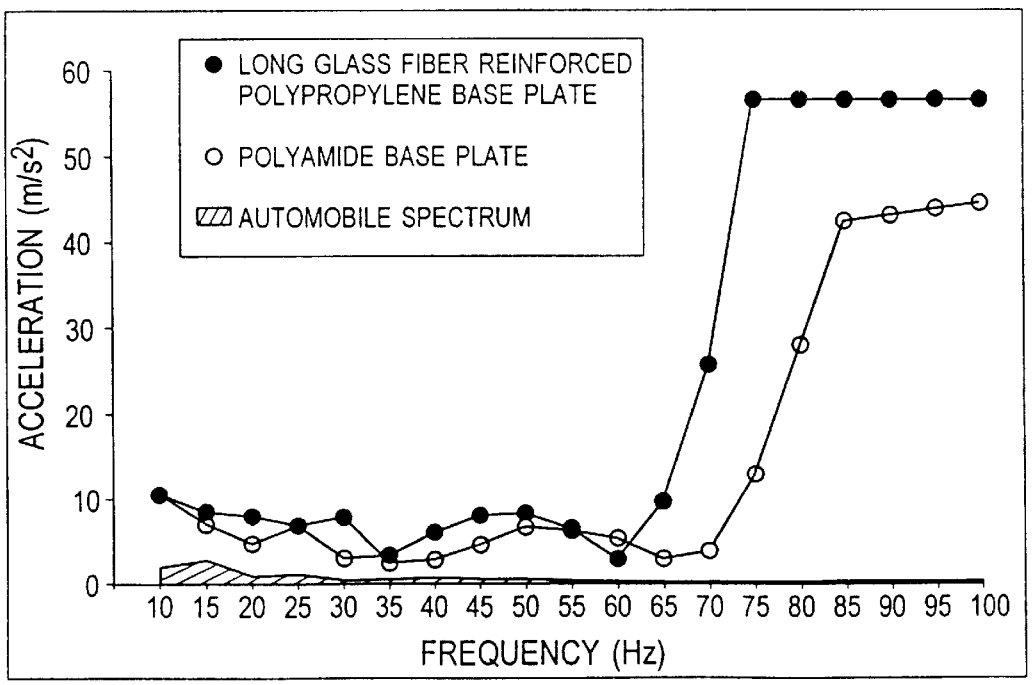
FIG. 10 is a graphical illustration of a comparison of the results of a vibration study focusing on the Z vector, among a right side base plate produced in accordance with one aspect of the present invention, a conventional right side base plate comprised of a polyamide-based material, and the whole automobile itself.

FIG. 10 is a graphical illustration of a comparison of the results of the same vibration study focusing on the Z vector, among a right side base plate produced in accordance with one aspect of the present invention (e.g., long glass fiber reinforced polypropylene materials wherein the long glass fibers are present in the amount of about 25 weight percent based on the total weight of the component), a conventional right side base plate comprised of a polyamide-based material, and the whole automobile itself.

With reference to Tables I–VI and FIGS. 5–10, it can be seen that the acceleration/frequency curves of the base plate produced in accordance with the general teachings of the present invention, while not being superior to, were nonetheless comparable to the acceleration/frequency curves of the heavier and more expensive conventional base plate comprised of polyamide-based materials. Thus, the base plate produced in accordance with the general teachings of the present invention had an acceptable vibration profile, as compared to conventional base plates, while simultaneously realizing significant weight and cost savings.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A mixture comprised of polypropylene and long glass fibers, wherein the mixture is formed into a mirror assembly component, wherein the long glass fibers are present in the range of about 20 to less than 30 weight percent based on the total weight of the component, wherein at least a portion of a surface of the component is substantially free of any long glass fiber readout.

2. The invention according to claim 1, wherein the long glass fibers are present in the range of about 25 to less than 30 weight percent based on the total weight of the component.

3. The invention according to claim 1, wherein the long glass fibers are present in the range of about 25 to about 28 weight percent based on the total weight of the component.

4. The invention according to claim 1, wherein the component is a mirror case.

5. The invention according to claim 1, wherein the component is a frame.

6. The invention according to claim 1, wherein the component is an integral mirror case/frame.

7. The invention according to claim 1, wherein the component is a base plate.

8. The invention according to claim 1, wherein the component is a base chassis.

9. The invention according to claim 1, wherein the component is an integral base cover/base chassis.

10. The invention according to claim 1, wherein the mixture further comprises an ultraviolet radiation stabilizer.

11. A mixture comprised of polypropylene and long glass fibers, wherein the mixture is formed into a mirror case component, wherein the long glass fibers are present in the range of about 20 to less than 30 weight percent based on the total weight of the component, wherein at least a portion of a surface of the component is substantially free of any long glass fiber readout.

12. The invention according to claim 11, wherein the long glass fibers are present in the range of about 25 to less than 30 weight percent based on the total weight of the component.

13. The invention according to claim 11, wherein the long glass fibers are present in the range of about 25 to about 28 weight percent based on the total weight of the component.

14. The invention according to claim 11, wherein the mixture further comprises an ultraviolet radiation stabilizer.

15. A mixture comprised of polypropylene and long glass fibers, wherein the mixture is formed into a base plate component, wherein the long glass fibers are present in the range of about 20 to less than 30 weight percent based on the total weight of the component, wherein at least a portion of a surface of the component is substantially free of any long glass fiber readout.

16. The invention according to claim 15, wherein the long glass fibers are present in the range of about 25 to less than 30 weight percent based on the total weight of the component.

17. The invention according to claim 15, wherein the long glass fibers are present in the range of about 25 to about 28 weight percent based on the total weight of the component.

18. The invention according to claim 15, wherein the mixture further comprises an ultraviolet radiation stabilizer.

19. A mixture comprised of polypropylene and long glass fibers, wherein the mixture is formed into a mirror case/frame component, wherein the long glass fibers are present in the range of about 20 to less than 30 weight percent based on the total weight of the component, wherein at least a portion of a surface of the component is substantially free of any long glass fiber readout.

20. The invention according to claim 19, wherein the long glass fibers are present in the range of about 25 to less than 30 weight percent based on the total weight of the component.

21. The invention according to claim 19, wherein the long glass fibers are present in the range of about 25 to about 28 weight percent based on the total weight of the component.

22. The invention according to claim 19, wherein the mixture further comprises an ultraviolet radiation stabilizer.

23. A mixture comprised of polypropylene and long glass fibers, wherein the mixture is formed into an integral base plate/base chassis component, wherein the long glass fibers are present in the range of about 20 to less than 30 weight percent based on the total weight of the component, and wherein at least a portion of a surface of the component is substantially free of any long glass fiber readout.

24. The invention according to claim 23, wherein the long glass fibers are present in the range of about 25 to less than 30 weight percent based on the total weight of the component.

25. The invention according to claim 23, wherein the long glass fibers are present in the range of about 25 to about 28 weight percent based on the total weight of the component.

26. The invention according to claim 23, wherein the mixture further comprises an ultraviolet radiation stabilizer.

* * * * *

UNITED STATES PATENT AND TRADEMARK OFFICE
CERTIFICATE OF CORRECTION

PATENT NO. : 6,555,222 B1
DATED : April 29, 2003
INVENTOR(S) : Bernard Duroux et al.

It is certified that error appears in the above-identified patent and that said Letters Patent is hereby corrected as shown below:

Title page,
Item [56], References Cited, U.S. PATENT DOCUMENTS,
"5,432,460" should be --5,432,640 --;
"8/1997" should be -- 10/1997 --; and
"5,971,544" should be -- 5,971,554 --.

Signed and Sealed this

Twenty-second Day of March, 2005

JON W. DUDAS
*Director of the United States Patent and Trademark Office*